(12) United States Patent
Jeddeloh

(10) Patent No.: US 8,607,002 B2
(45) Date of Patent: *Dec. 10, 2013

(54) MEMORY PREFETCH SYSTEMS AND METHODS

(71) Applicant: Micron Technology, Inc., Boise, ID (US)

(72) Inventor: Joe M. Jeddeloh, Shoreview, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 13/751,502

(22) Filed: Jan. 28, 2013

(65) Prior Publication Data

US 2013/0145098 A1   Jun. 6, 2013

Related U.S. Application Data

(63) Continuation of application No. 12/371,389, filed on Feb. 13, 2009, now Pat. No. 8,364,901.

(51) Int. Cl.
*G06F 12/00* (2006.01)
(52) U.S. Cl.
USPC ............................ 711/137; 711/114; 711/118

(58) Field of Classification Search
None
See application file for complete search history.

(56) References Cited

U.S. PATENT DOCUMENTS

| 7,426,144 | B2 | 9/2008 | Fujisawa |
| 8,364,901 | B2 * | 1/2013 | Jeddeloh ........................ 711/137 |
| 2004/0123043 | A1 | 6/2004 | Rotithor et al. |
| 2005/0152210 | A1 | 7/2005 | Park et al. |
| 2005/0257005 | A1 | 11/2005 | Jeddeloh |
| 2007/0005902 | A1 | 1/2007 | Petersen et al. |
| 2007/0204106 | A1 | 8/2007 | Donald et al. |
| 2007/0220207 | A1 | 9/2007 | Black et al. |
| 2010/0121994 | A1 | 5/2010 | Kim et al. |
| 2010/0211745 | A1 | 8/2010 | Jeddeloh |

FOREIGN PATENT DOCUMENTS

| JP | 2001014840 A | 1/2001 |
| WO | WO-2010093921 A2 | 8/2010 |
| WO | WO-2010093921 A3 | 8/2010 |

* cited by examiner

*Primary Examiner* — Shawn X Gu
(74) *Attorney, Agent, or Firm* — Schwegman, Lundberg & Woessner, P.A.

(57) ABSTRACT

Systems and methods are disclosed herein, including those that operate to prefetch a programmable number of data words from a selected memory vault in a stacked-die memory system when a pipeline associated with the selected memory vault is empty.

28 Claims, 7 Drawing Sheets

MEMORY PREFETCH SYSTEMS AND METHODS

PRIORITY APPLICATION

This application is a continuation of U.S. application Ser. No. 12/371,389, filed Feb. 13, 2009, now issued as U.S. Pat. No. 8,364,901, which is incorporated herein by reference in its entirety.

TECHNICAL FIELD

Various embodiments described herein relate to systems and methods associated with semiconductor memories and systems and methods associated with memory prefetch.

BACKGROUND INFORMATION

Microprocessor technology has evolved at a faster rate than that of semiconductor memory technology. As a result, a mis-match in performance often exists between the modern host processor and the semiconductor memory subsystem to which the processor is mated to receive instructions and data. For example, it is estimated that some high-end servers idle three out of four clocks waiting for responses to memory requests.

In addition, the evolution of software application and operating system technology has increased demand for higher-density memory subsystems as the number of processor cores and threads continues to increase. However, current-technology memory subsystems often represent a compromise between performance and density. Higher bandwidths may limit the number of memory cards or modules that may be connected in a system without exceeding JEDEC electrical specifications.

Extensions to the JEDEC interface have been proposed but may be generally found lacking as to future anticipated memory bandwidths and densities. Weaknesses include lack of memory power optimization and the uniqueness of the interface between the host processor and the memory subsystem. The latter weakness may result in a need to redesign the interface as processor and/or memory technologies change.

DETAILED DESCRIPTION

Figure 1:
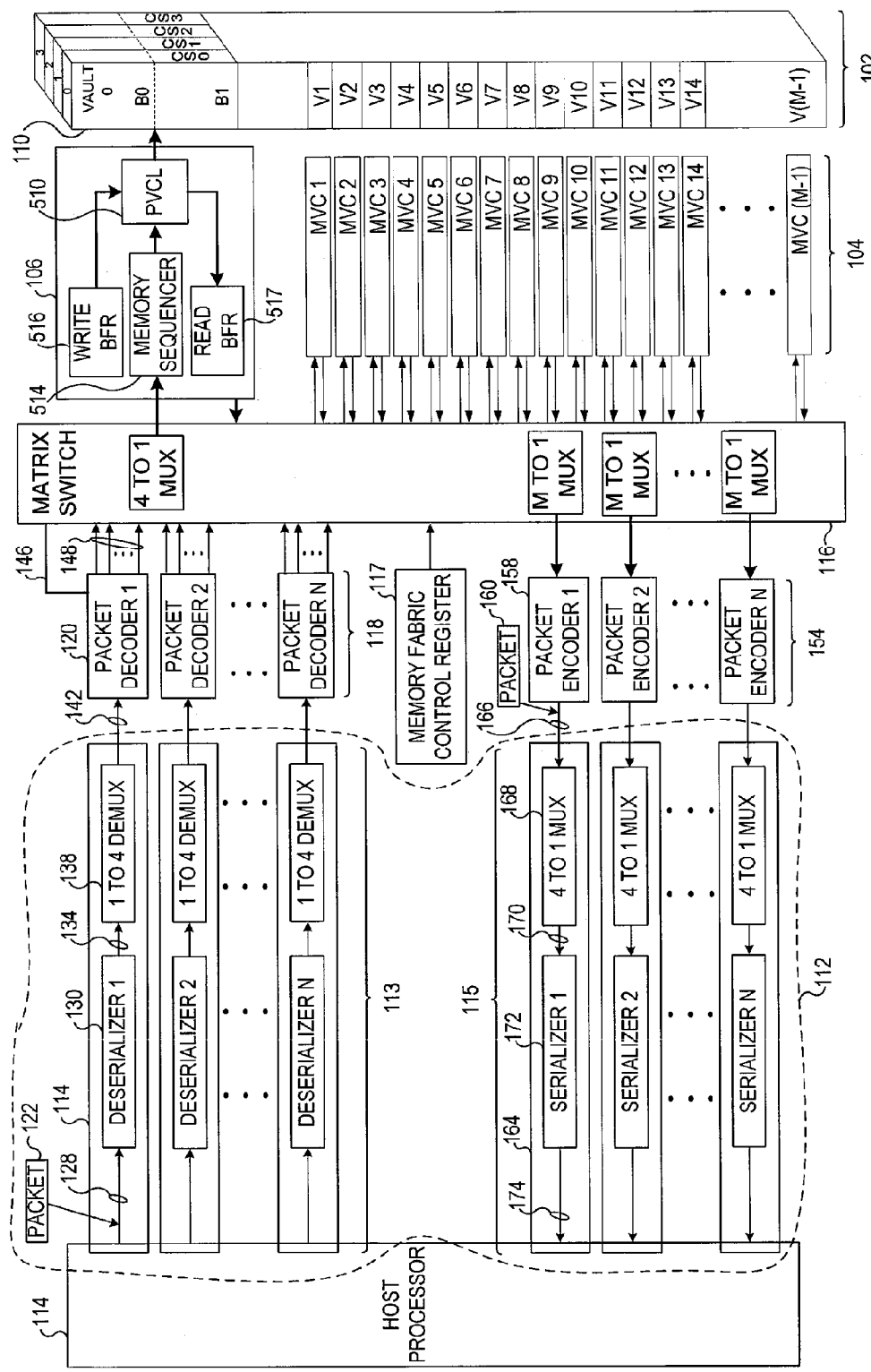
FIG. 1 is a block diagram of a memory system according to various example embodiments of the current invention.

FIG. 1 is a block diagram of a memory system 100 according to various example embodiments of the current invention. One or more embodiments operate to substantially concurrently transfer a plurality of outbound streams of commands, addresses, and/or data between one or more originating devices (e.g., one or more processors) and a set of stacked-array memory "vaults." Increased memory system density, bandwidth, parallelism, and scalability may result.

Multi-die memory array embodiments herein aggregate control logic that is normally located on each individual memory array die in previous designs. Subsections of a stacked group of dies, referred to herein as a "memory vault," share common control logic. The memory vault architecture strategically partitions memory control logic to increase energy efficiency while providing a finer granularity of powered-on memory banks. Embodiments herein also enable a standardized host processor to memory system interface. The standardized interface may reduce re-design cycle times as memory technology evolves.

Figure 2:
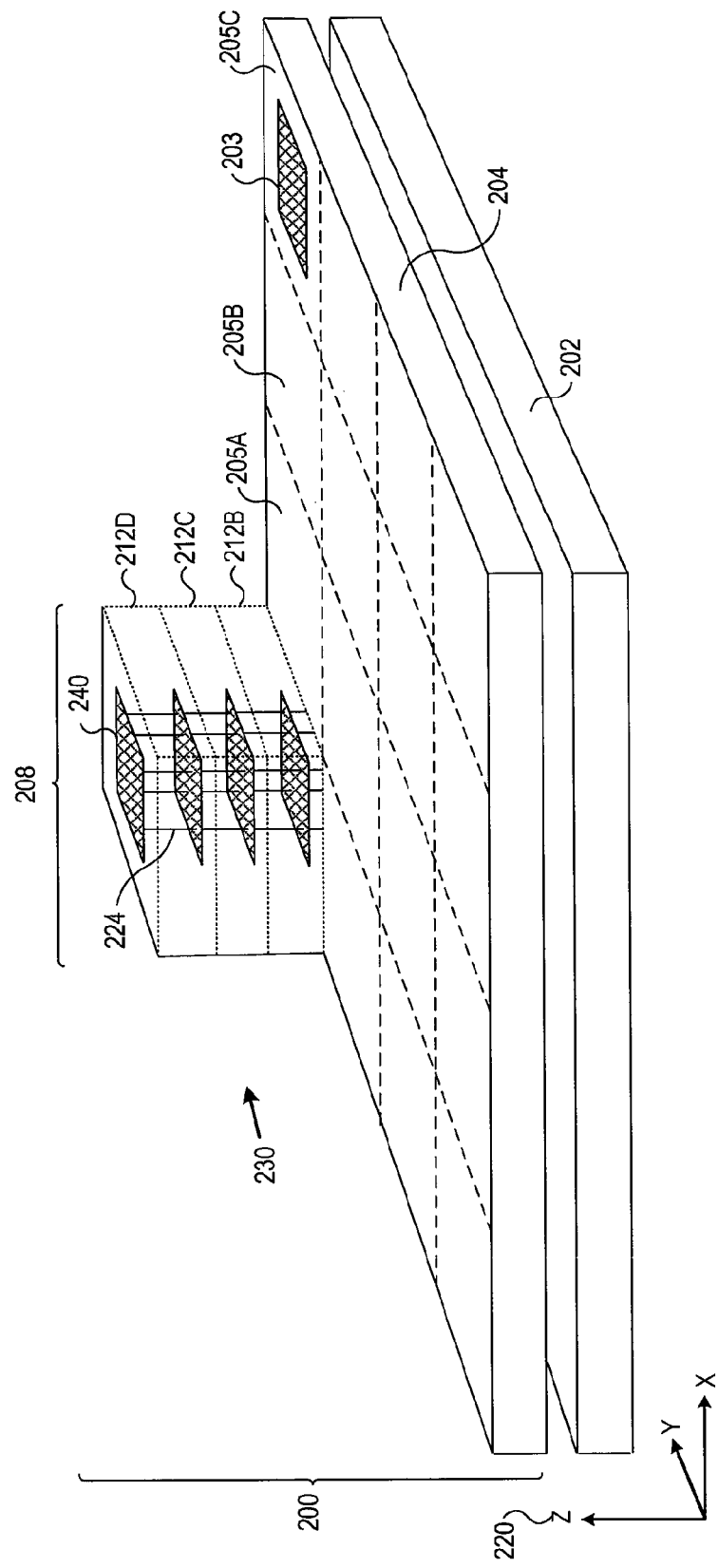
FIG. 2 is a cut-away conceptual view of a stacked-die 3D memory array stacked with a logic die according to various example embodiments.

FIG. 2 is a cut-away conceptual view of a stacked-die 3D memory array 200 stacked with a logic die 202 according to various example embodiments. The memory system 100 incorporates one or more stacks of tiled memory arrays such as the stacked-die 3D memory array 200. Multiple memory arrays (e.g., the memory array 203) are fabricated onto each of a plurality of stacked dies (e.g., the stacked die 204).

Each of the stacked dies is logically divided into multiple "tiles" (e.g., the tiles 205A, 205B, and 205C associated with the stacked die 204). Each tile (e.g., the tile 205C) may include one or more memory arrays 203. In some embodiments, each memory array 203 may be configured as one or more independent memory banks in the memory system 100. The memory arrays 203 are not limited to any particular memory technology and may include dynamic random-access memory (DRAM), static random access memory (SRAM), flash memory, etc.

A stacked set of memory array tiles 208 may include a single tile from each of the stacked dies (e.g., the tiles 212B, 212C and 212D, with the base tile hidden from view in FIG. 1). Power, address, and/or data and similar common signals may traverse the stacked set of tiles 208 in the "Z" dimension 220 on conductive paths (e.g., the conductive path 224), such as through-wafer interconnects (TWIs). The stacked-die 3D memory array 200 is thus partitioned into a set of memory "vaults" (e.g., the memory vault 230). Each memory vault includes a stacked set of tiles, one tile from each of a plurality of stacked dies. Each tile of the vault includes one or more memory arrays (e.g., the memory array 240).

The resulting set of memory vaults 102 is shown in FIG. 1. Control, switching, and communication logic described here below is fabricated onto the logic die 202. The memory system 100 includes a plurality of memory vault controllers (MVCs) 104 (e.g., the MVC 106). Each MVC is communicatively coupled to a corresponding memory vault (e.g., the memory vault 110) in a one-to-one relationship. Each MVC is thus capable of communicating with a corresponding memory vault independently from communications between other MVCs and their respective memory vaults.

The memory system 100 also includes a plurality of configurable serialized communication link interfaces (SCLIs) 112. The SCLIs 112 are divided into an outbound group of SCLIs 113 (e.g., the outbound SCLI 114) and an inbound group of SCLIs 115. Each of the plurality of SCLIs 112 is capable of concurrent operation with the other SCLIs 112. Together the SCLIs 112 communicatively couple the plurality of MVCs 104 to one or more host processor(s) 114. The memory system 100 presents a highly abstracted, multi-link, high-throughput interface to the host processor(s) 114.

The memory system 100 may also include a matrix switch 116. The matrix switch 116 is communicatively coupled to the plurality of SCLIs 112 and to the plurality of MVCs 104. The matrix switch 116 is capable of cross-connecting each SCLI to a selected MVC. The host processor(s) 114 may thus access the plurality of memory vaults 102 across the plurality of SCLIs 112 in a substantially simultaneous fashion. This architecture can provide the processor-to-memory bandwidth needed by modern processor technologies, including multi-core technologies.

The memory system 100 may also include a memory fabric control register 117 communicatively coupled to the matrix switch 116. The memory fabric control register 117 accepts memory fabric configuration parameters from a configuration source and configures one or more components of the memory system 100 to operate according to a selectable mode. For example, the matrix switch 116 and each of the plurality of memory vaults 102 and the plurality of MVCs 104 may normally be configured to operate independently of each other in response to separate memory requests. Such a configuration may enhance memory system bandwidth as a result of the parallelism between the SCLIs 112 and the memory vaults 102.

Alternatively, the memory system 100 may be reconfigured via the memory fabric control register 117 to cause a subset of two or more of the plurality of memory vaults 102 and a corresponding subset of MVCs to operate synchronously in response to a single request. The latter configuration may be used to access a wider-than-normal data word to decrease latency, as further described below. Other configurations may be enabled by loading a selected bit pattern into the memory fabric control register 117.

Figure 3:
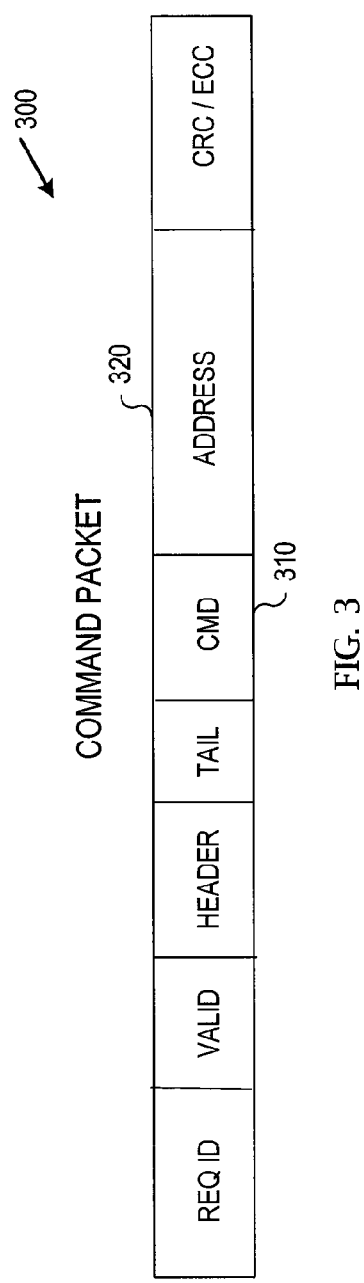
FIGS. 3 and 4 are packet diagrams showing fields associated with example packets according to various example embodiments.
Figure 4:
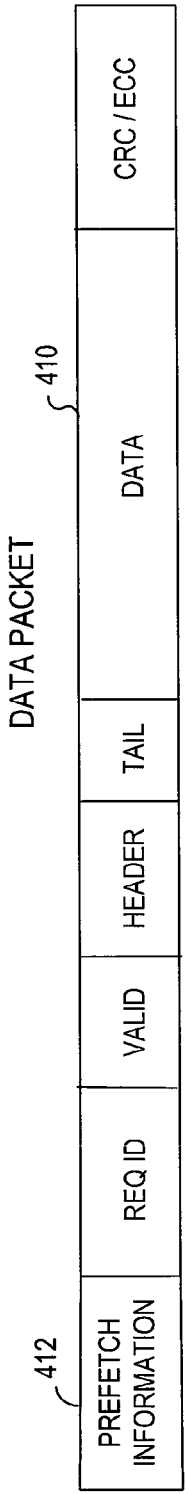

FIGS. 3 and 4 are packet diagrams showing fields associated with example packets 300 and 400, respectively, according to various example embodiments. Turning to FIG. 1 in light of FIGS. 3 and 4, the memory system 100 may also include a plurality of packet decoders 118 (e.g., the packet decoder 120) communicatively coupled to the matrix switch 116. The host processor(s) 114 assemble an outbound packet 122 that in some embodiments may be similar in structure to the example packet 300 or 400. That is, the outbound packet 122 may contain a command field 310, an address field 320, and/or a data field 410. The outbound packet 122 may also contain a prefetch information field 412 to hold prefetch information associated with prefetch operations in the memory vault. Prefetch operations are described below with reference to FIG. 5, FIG. 5A, FIG. 6A and FIG. 6B. Turning to FIG. 1, after the host processor 114 assembles the outbound packet 122, it sends the outbound packet 122 across an outbound SCLI (e.g., the outbound SCLI 114) to the packet decoder 120 in a manner further explained below.

The outbound SCLI 114 may include a plurality of outbound differential pair serial paths (DPSPs) 128. The DPSPs 128 are communicatively coupled to the host processor(s) 114 and may collectively transport the outbound packet 122. That is, each DPSP of the plurality of outbound DPSPs 128 may transport a first data rate outbound sub-packet portion of the outbound packet 122 at a first data rate.

The outbound SCLI 114 may also include a deserializer 130 communicatively coupled to the plurality of outbound DPSPs 128. The deserializer 130 converts each first data rate outbound sub-packet portion of the outbound packet 122 to a plurality of second data rate outbound sub-packets. The plurality of second data rate outbound sub-packets is sent across a first plurality of outbound single-ended data paths (SEDPs) 134 at a second data rate. The second data rate is slower than the first data rate.

The outbound SCLI 114 may also include a demultiplexer 138 communicatively coupled to the deserializer 130. The demultiplexer 138 converts each of the plurality of second data rate outbound sub-packets to a plurality of third data rate outbound sub-packets. The plurality of third data rate outbound sub-packets is sent across a second plurality of outbound SEDPs 142 to the packet decoder 120 at a third data rate. The third data rate is slower than the second data rate.

The packet decoder 120 receives the outbound packet 122 and extracts the command field 310 (e.g., of the example packet 300), the address field 320 (e.g., of the example packet 300), and/or the data field (e.g., of the example packet 400). In some embodiments, the packet decoder 120 decodes the address field 320 to determine a corresponding set of memory vault select signals. The packet decoder 120 presents the set of memory vault select signals to the matrix switch 116 on an interface 146. The vault select signals cause the input data paths 148 to be switched to the MVC 106 corresponding to the outbound packet 122.

Turning now to a discussion of the inbound data paths, the memory system 100 may include a plurality of packet encoders 154 (e.g., the packet encoder 158) communicatively coupled to the matrix switch 116. The packet encoder 158 may receive an inbound memory command, an inbound memory address, and/or inbound memory data from one of the plurality of MVCs 104 via the matrix switch 116. The packet encoder 158 encodes the inbound memory command, address, and/or data into an inbound packet 160 for transmission across an inbound SCLI 164 to the host processor(s) 114.

In some embodiments, the packet encoder 158 may segment the inbound packet 160 into a plurality of third data rate inbound sub-packets. The packet encoder 158 may send the plurality of third data rate inbound sub-packets across a first plurality of inbound single-ended data paths (SEDPs) 166 at a third data rate. The memory system 100 may also include a multiplexer 168 communicatively coupled to the packet encoder 158. The multiplexer 168 may multiplex each of a plurality of subsets of the third data rate inbound sub-packets into a second data rate inbound sub-packet. The multiplexer 168 sends the second data rate inbound sub-packets across a second plurality of inbound SEDPs 170 at a second data rate that is faster than the third data rate.

The memory system 100 may further include a serializer 172 communicatively coupled to the multiplexer 168. The serializer 172 aggregates each of a plurality of subsets of the second data rate inbound sub-packets into a first data rate inbound sub-packet. The first data rate inbound sub-packets are sent to the host processor(s) 114 across a plurality of inbound differential pair serial paths (DPSPs) 174 at a first data rate that is faster than the second data rate. Command, address, and data information is thus transferred back and forth between the host processor(s) 114 and the MVCs 104 across the SCLIs 112 via the matrix switch 116.

Figure 5:
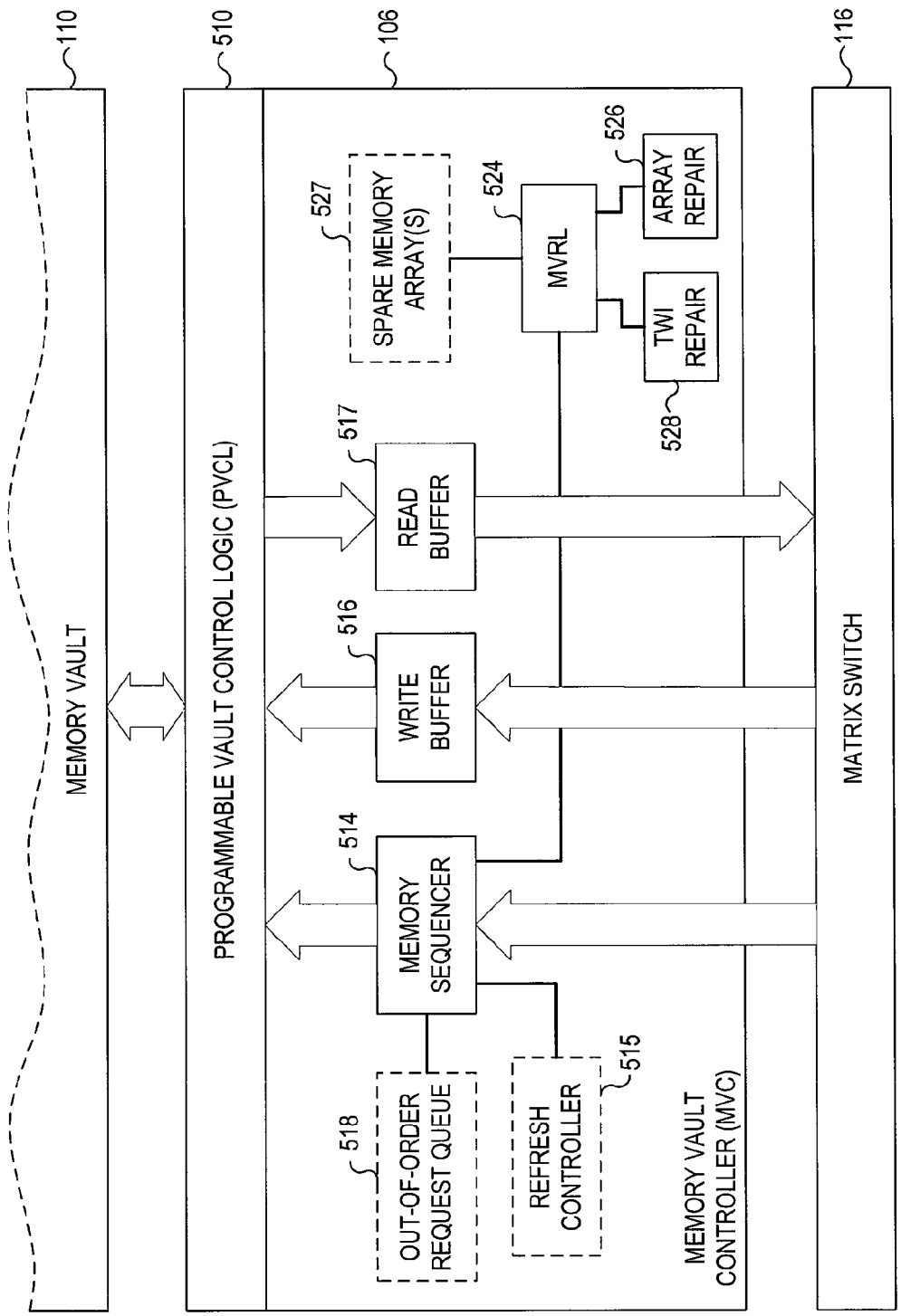
FIG. 5 is a block diagram of a memory vault controller and associated modules according to various example embodiments.

FIG. 5 is a block diagram of an MVC (e.g., the MVC 106) and associated modules according to various example embodiments. The MVC 106 may include a programmable vault control logic (PVCL) component (e.g., the PVCL 510). The PVCL 510 interfaces the MVC 106 to the corresponding memory vault (e.g., the memory vault 110). The PVCL 510 generates one or more bank control signals and/or timing signals associated with the corresponding memory vault 110.

The PVCL 510 may be configured to adapt the MVC 106 to a memory vault 110 of a selected configuration or a selected technology. Thus, for example, the memory system 100 may initially be configured using currently-available DDR2 DRAMs. The memory system 100 may subsequently be adapted to accommodate DDR3-based memory vault technology by reconfiguring the PVCL 510 to include DDR3 bank control and timing logic.

The MVC 106 may also include a memory sequencer 514 communicatively coupled to the PVCL 510. The memory sequencer 514 performs a memory technology dependent set of operations based upon the technology used to implement the associated memory vault 110. The memory sequencer 514 may, for example, perform command decode operations, memory address multiplexing operations, memory address demultiplexing operations, memory refresh operations, memory vault training operations, and/or memory vault prefetch operations associated with the corresponding memory vault 110. In some embodiments, the memory sequencer 514 may comprise a DRAM sequencer. In some embodiments, memory refresh operations may originate in a refresh controller 515.

The memory sequencer 514 may be configured to adapt the memory system 100 to a memory vault 110 of a selected configuration or technology. For example, the memory sequencer 514 may be configured to operate synchronously with other memory sequencers associated with the memory system 100. Such a configuration may be used to deliver a wide data word from multiple memory vaults to a cache line (not shown) associated with the host processor(s) 114 in response to a single cache line request.

The MVC 106 may also include a write buffer 516. The write buffer 516 may be communicatively coupled to the PVCL 510 to buffer data arriving at the MVC 106 from the host processor(s) 114. The MVC 106 may further include a read buffer 517. The read buffer 517 may be communicatively coupled to the PVCL 510 to buffer data arriving at the MVC 106 from the corresponding memory vault 110.

The MVC 106 may also include an out-of-order request queue 518. The out-of-order request queue 518 establishes an ordered sequence of read and/or write operations to the plurality of memory banks included in the memory vault 110. The ordered sequence is chosen to avoid sequential operations to any single memory bank in order to reduce bank conflicts and to decrease read-to-write turnaround time.

The MVC 106 may also include a memory vault repair logic (MVRL) component 524. The MVRL 524 may be communicatively coupled to the memory vault 110 to perform defective memory array address remapping operations using array repair logic 526. The MVRL 524 may also perform TWI repair operations associated with the memory vault 110 using TWI repair logic 528.

Figure 5A:
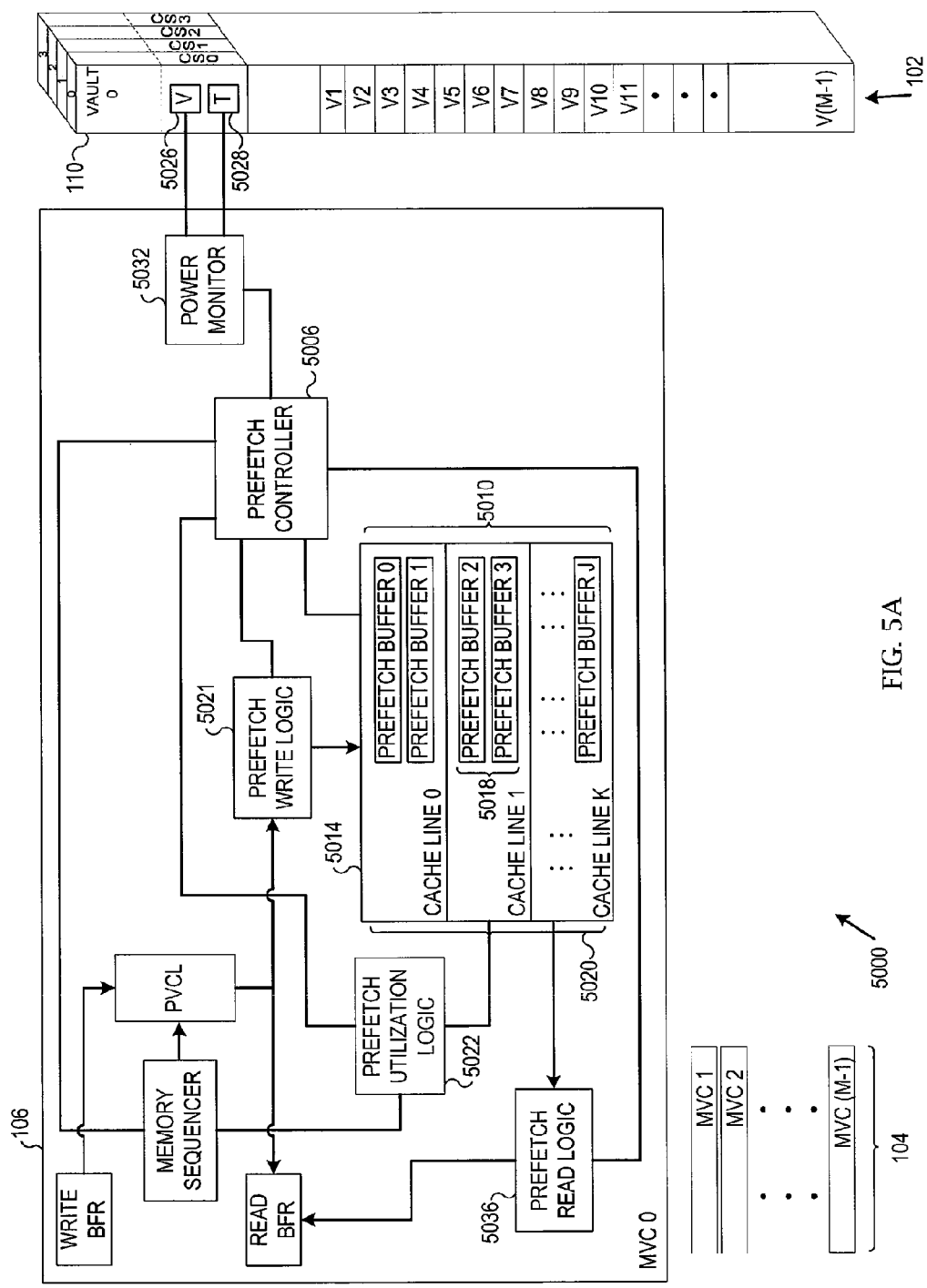
FIG. 5A is a block diagram of a memory system according to various example embodiments.

FIG. 5A is a block diagram of a memory system 5000 according to various example embodiments. The memory system 5000 may include a set of memory vaults 102 (e.g., the memory vault 110) and a corresponding set of MVCs 104 (e.g., the MVC 106). The MVCs are fabricated on a logic die (e.g., the logic die 202 of FIG. 2) stacked with memory array dies (e.g., the memory array die 204 of FIG. 2), as previously discussed.

The following discussion of FIG. 5A refers to connections between the example memory vault 110, the example MVC 106, and various structural elements associated with memory vault prefetch operations. It is noted, however, that the connections and functionality described below and illustrated on FIG. 5A apply to each one of the set of memory vaults 102 and to each one of the corresponding set of MVCs 104.

In some embodiments of the memory system 5000, the bandwidth of the memory vaults 102 may exceed the bandwidth of the communication channels linking the memory vaults 102 to a device originating memory requests (e.g., a host computer). Additionally, the request stream from the originating device may not be continuous. These factors may result in excess bandwidth at the memory vaults 102. The excess bandwidth may be used to perform prefetch operations. Prefetch operations may be performed when the memory vault is idle, for example, when no read requests to the memory vault are being processed at the memory vault. Alternatively, prefetch operations may be performed when the memory vault is not idle.

The memory system 5000 may include a prefetch controller 5006. The prefetch controller 5006 performs prefetch operations associated with the memory vault 110. The memory system 5000 may also include one or more prefetch buffers 5010 included in a prefetch cache 5014. The prefetch buffers 5010 may be communicatively coupled to the prefetch controller 5006. A set of the prefetch buffers 5010 (e.g., the set of prefetch buffers 5018) may be grouped to store one or more cache lines (e.g., the cache lines 5020) of read data. The prefetch controller 5006 may be configured to selectively enable one or more of the cache lines 5020.

The prefetch controller 5006 may be configured to issue a prefetch read request to the memory vault 110, such that the prefetch read request may be issued when the memory vault 110 is idle or when memory vault 110 is not idle. In some embodiments, the prefetch data word(s) may be read from a memory vault address corresponding to a data word read in response to a previous read request. Alternatively (or in addition), the prefetch data words may be read from a memory vault address selected from a range of addresses provided by an originating device issuing commands to the MVC 106. For example, a host computer may specify a range of addresses to be prefetched and cached in the prefetch buffers 5010.

The memory system 5000 may also include prefetch write logic 5021 communicatively coupled to the prefetch controller 5006. The prefetch write logic 5021 tracks and updates the memory vault 110 and the prefetch buffers 5010 with write data.

The use of prefetch by the memory system 5000 may be more desirable under some operating conditions than others. "Locality" as it relates to electronic memory technology refers to a probability that the next memory request will reference data from the same spatial area of memory as the previous request. A memory vault data request stream with greater locality may benefit more from prefetch operations than a data request stream with lesser locality. And, it should be noted that prefetch operations consume power at the memory vault 110. Consequently, the prefetch controller 5006 may be configured to selectively enable and/or disable prefetch operations. Some embodiments may enable/disable prefetch operations according to the anticipated locality of the data stream and/or to target a selected power budget associated with the memory vault 110.

The memory system 5000 may include prefetch utilization logic 5022 communicatively coupled to the prefetch controller 5006. The prefetch utilization logic 5022 tracks the number of cache line hits during a hit measurement period. A "cache line hit" in the context of this application occurs when a read request references a memory vault address at which a data word is stored and the data word is found in the cache. The prefetch controller 5006 may be configured to disable prefetch operations if the hit rate associated with the prefetch cache 5014 is below a selected threshold during the hit rate measurement period. Prefetch operations may be disabled for a selected period of time or until a command to resume prefetch operations is received from an originating device such as a host computer. In some embodiments, prefetch may be turned on and off on an individual cache line basis.

The memory system 5000 may also include one or more voltage and/or temperature sensors 5026 and 5028, respectively, located at the memory vault 110. A power monitor 5032 may be coupled to the voltage sensor(s) 5026 and/or to the temperature sensor(s) 5028. The power monitor 5032 may provide an indication to the prefetch controller 5006 of a level of power consumption at the memory vault 110. The prefetch controller 5006 may be configured to disable prefetch operations if the level of power consumption at the memory vault 110 is above a first selected threshold. Prefetch operations may be re-enabled following expiration of a selected period of time. Alternatively, prefetch may be re-enabled when the level of power consumption drops below a second selected threshold, or upon receipt of a command from an originating device to resume prefetch.

The memory system 5000 may further include prefetch read logic 5036 communicatively coupled to the prefetch controller 5006. The prefetch read logic 5036 may read one or more prefetch words from one or more of the prefetch buffers 5010 if a read request received at the MVC 106 references one or more of the prefetch words.

Thus, the memory system 100; the memory arrays 200, 203, 240, 527; the die 202, 204; the tiles 205A, 205B, 205C, 208, 212B, 212C, 212D; the "Z" dimension 220; the paths 224, 148; the memory vaults 230, 102, 110; the MVCs 104, 106; the SCLIs 112, 113, 114, 115, 164; the processor(s) 114; the matrix switch 116; the register 117; the packets 300, 400, 122, 160; the packet decoders 118, 120; the fields 310, 320, 410; the DPSPs 128, 174; the deserializer 130; the SEDPs 134, 142, 166, 170; the demultiplexer 138; the interface 146; the packet encoders 154, 158; the multiplexer 168; the serializer 172; the PVCL 510; the memory sequencer 514; the refresh controller 515; the buffers 516, 517; the out-of-order request queue 518; the MVRL 524; the array repair logic 526; the TWI repair logic 528; the memory system 5000; the prefetch controller 5006; the prefetch buffers 5010, 5018; the prefetch cache 5014; the cache lines 5020; the prefetch write logic 5021; the prefetch utilization logic 5022; the sensors 5026, 5028; the power monitor 5032; and the prefetch read logic 5036 may all be characterized as "modules" herein.

The modules may include hardware circuitry, optical components, single or multi-processor circuits, memory circuits, software program modules and objects encoded in a computer-readable medium (but not software listings), firmware, and combinations thereof, as desired by the architect of the memory system 100 and as appropriate for particular implementations of various embodiments.

The apparatus and systems of various embodiments may be useful in applications other than a high-density, multi-link, high-throughput semiconductor memory subsystem 5000. Thus, various embodiments of the invention are not to be so limited. The illustration of the memory system 5000 is intended to provide a general understanding of the structure of various embodiments. It is not intended to serve as a complete description of all the elements and features of apparatus and systems that might make use of the structures described herein.

The novel apparatus and systems of various embodiments may comprise or be incorporated into electronic circuitry used in computers, communication and signal processing circuitry, single-processor or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 6A:
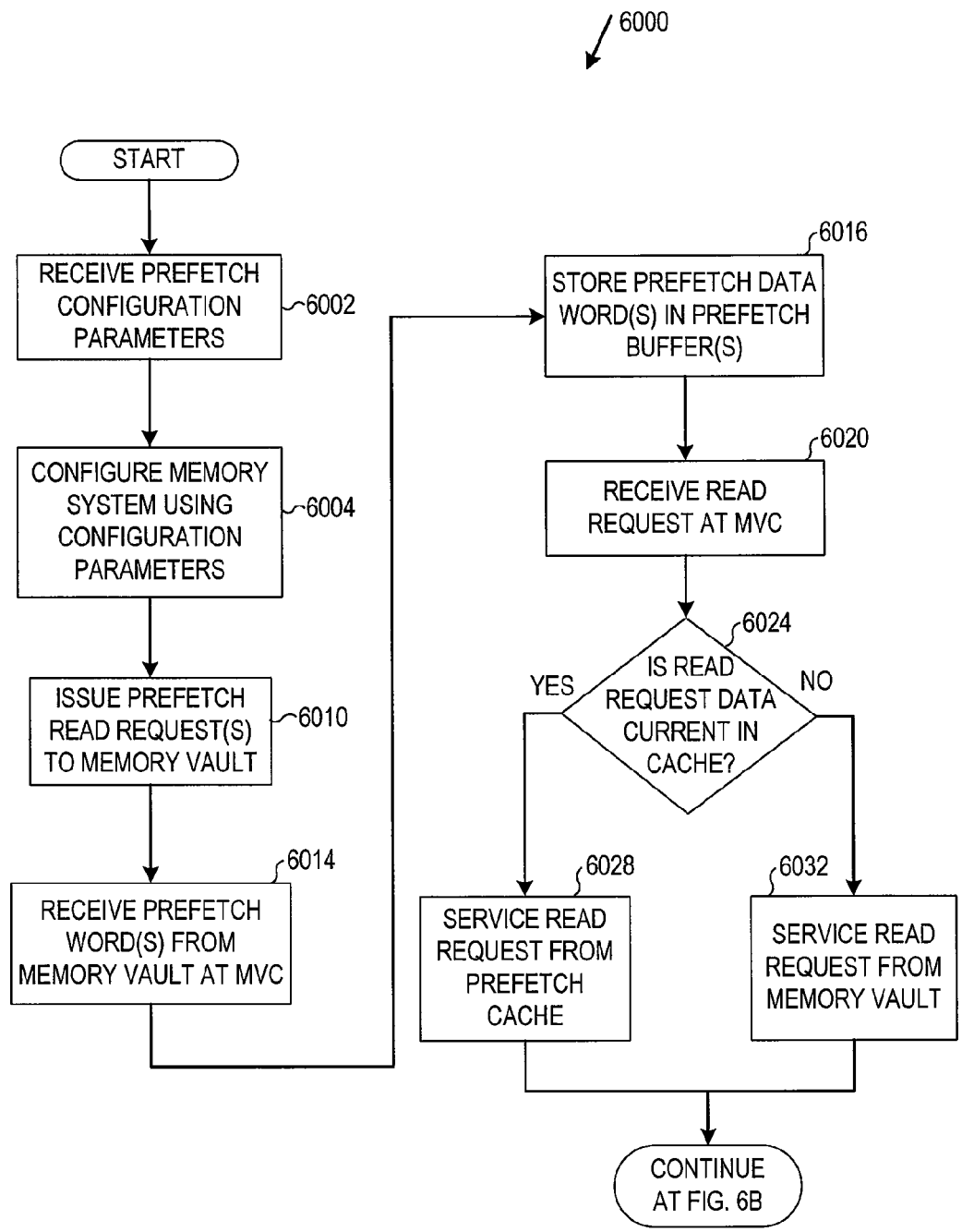
FIGS. 6A and 6B are flow diagrams illustrating a method according to various example embodiments.
Figure 6B:
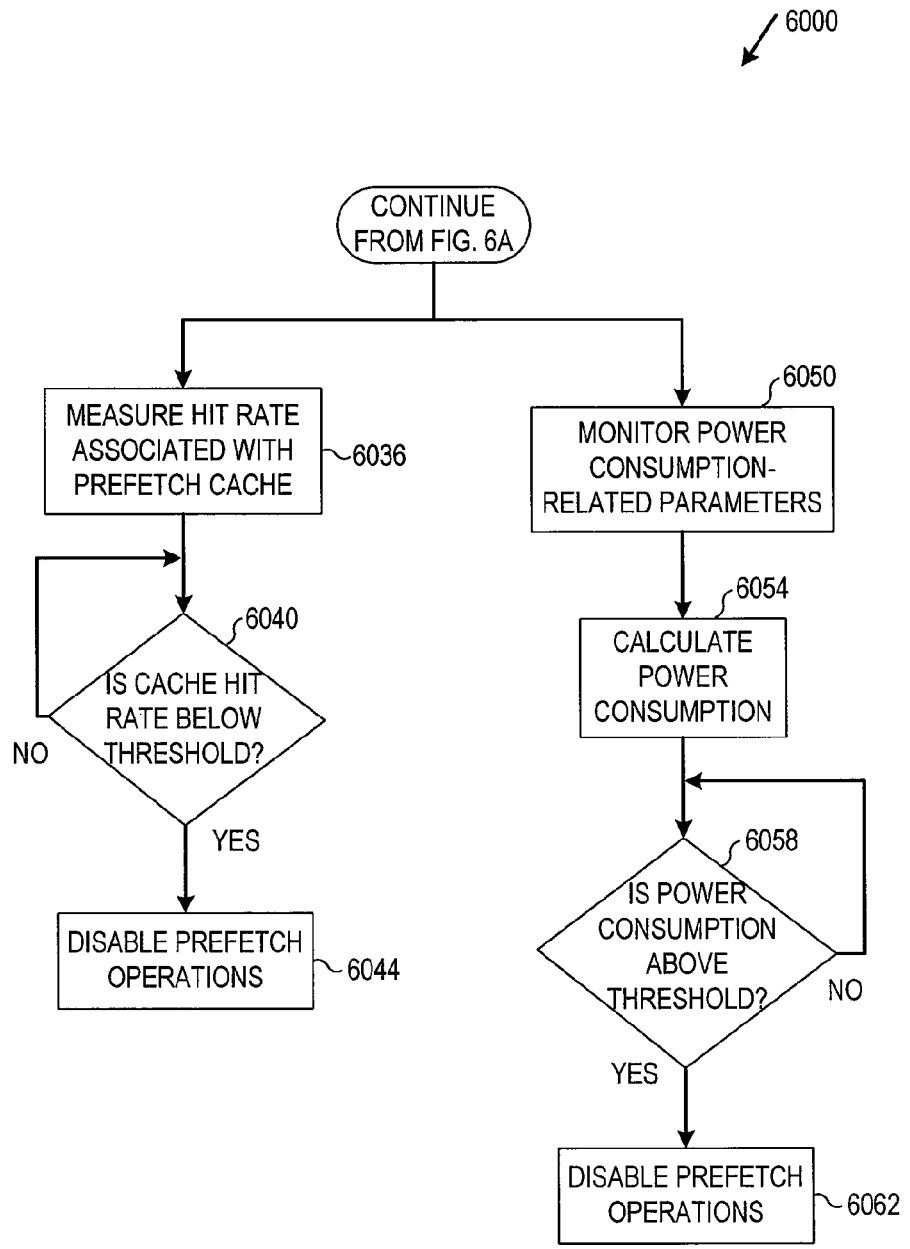

FIGS. 6A and 6B are flow diagrams illustrating a method 6000 according to various example embodiments. The method 6000 includes performing prefetch operations associated with one or more memory vaults in a stacked-die memory system (e.g., at the memory vault 110 in the stacked-die memory system 5000 of FIG. 5A). Prefetch operations may be selectively enabled or disabled and prefetch parameters separately configured for each individual memory vault. In some embodiments, a programmable number of data words may be prefetched at times when a memory vault pipeline is empty.

The method 6000 may commence at block 6002 with receiving prefetch configuration parameters at an MVC (e.g., at the MVC 106 of FIG. 5A) from an originating device (e.g., from a host computer). The prefetch configuration parameters may include a prefetch address modality. "Prefetch address modality" in this context means whether an address to be prefetched from the memory vault corresponds to a previously-accessed address or an address from a range specified by the originating device. Other configuration parameters may include cache line access parameters such as the number of cache lines to return when a cache hit occurs. The method 6000 may also include configuring the memory system using the prefetch configuration parameters, at block 6004.

The method 6000 may continue with issuing one or more prefetch read requests to the memory vault, at block 6010. The method 6000 may confirm whether the memory vault is idle before it issues a prefetch read request. If the memory vault is idle, for example, when no other read requests to the memory vault are being processed at the memory vault, the method 6000 may issue the prefetch read request and initiate prefetch operations. Alternatively, the method 6000 may issue the prefetch read request when the memory vault is not idle, such that prefetch operations may be automatically initiated upon receiving a read request even if one or more other read requests to the memory vault are being processed at the memory vault.

Method 600 may skip issuing a prefetch read request to a memory vault (box 6010) if the memory vault receives from an originating device (e.g., from a host computer) a prefetch information that indicates not to perform prefetch operations. For example, when method 600 is used in memory system 100 of FIG. 1, the host processor 114 of FIG. 1 may send the outbound packet 112 with a prefetch information that indicates not to perform prefetch operations. The prefetch information may be contained in a field of the outbound packet 122, such as prefetch information field 412 of FIG. 4. The memory vault may resume performing prefetch operations if it receives from the originating device a prefetch information that indicates prefetch operations are to be performed (or resumed). The prefetch information may include multiple bits or only a single bit having a value that indicates whether prefetch operations are to be performed (or resumed) or not performed (e.g., skipped or suspended). For example, if the prefetch information has only a single bit and if the single bit has a value of "0", then prefetch operations may be skipped or suspended. If the single bit has a value of "1", then prefetch operation may be performed (or resumed).

Turning to FIG. 6, the method 6000 may also include receiving one or more prefetch data words from the memory vault at an MVC corresponding to the memory vault, at block 6014. The method 6000 may further include storing the prefetch data words in one or more prefetch buffers at a prefetch cache, at block 6016.

The method 6000 may continue at block 6020 with receiving a read request at the MVC. The method 6000 may include determining whether the data referenced by the read request is current in the prefetch cache, at block 6024. If so, the method 6000 may continue at block 6028 with servicing the read request from the prefetch cache, resulting in a cache hit. If the data referenced by the read request is not current in the prefetch cache (no cache hit), the method 6000 may continue at block 6032 with servicing the read request from the selected memory vault.

The method 6000 may also include measuring a hit rate associated with the prefetch cache over a first period of time, at block 6036. The method 6000 may further include determining whether the cache hit rate is below a selected threshold, at block 6040. If so, the method 6000 may include disabling prefetch operations, at block 6044. Prefetch operations may be disabled for a selected period of time or until prefetch is re-enabled via command received from the originating device.

In some embodiments, the method 6000 may include monitoring one or more operational parameters associated with power consumption at the selected memory vault, at block 6050. For example, one or more voltage measurements and/or temperature measurements may be received from sensors within the memory vault. The method 6000 may also include calculating the power consumption at the memory vault based upon measurements of the operational parameters, at block 6054. The method 6000 may further include determining whether the power consumption is above a first selected threshold, at block 6058. If so, the method 6000 may also include disabling prefetch operations, at block 6062. Prefetch operations may be disabled for a selected period of time, until power consumption levels fall below a second selected threshold, or until prefetch is re-enabled via command received from the originating device.

It is noted that the activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using well-known mechanisms, including application program interfaces, inter-process communication techniques, and remote procedure calls, among others. The teachings of various embodiments are not limited to any particular programming language or environment.

The apparatus, systems, and methods described herein may operate to prefetch a programmable number of data words from a selected memory vault in a stacked-die memory system when a pipeline associated with the selected memory vault is empty. Increased levels of memory system performance may result.

By way of illustration and not of limitation, the accompanying figures show specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A memory system comprising:
    a first memory vault comprising a first stacked plurality of memory arrays, each memory array in the first stacked plurality of memory arrays located on one of a plurality of stacked memory dies;
    a second memory vault comprising a second stacked plurality of memory arrays, each memory array in the second stacked plurality of memory arrays located on one of the plurality of stacked memory dies, the plurality of stacked memory dies including a first memory die and a second memory die, the first stacked plurality of memory arrays including a first memory array and a second memory array, the first memory array located on the first memory die, the second memory array located on the second memory die, the second stacked plurality of memory arrays including a third memory array and a fourth memory array, the third memory array located on the first memory die, and the fourth memory array located on the second memory die;
    a memory vault controller communicatively coupled to the first memory vault to provide at least one of control, switching, or communication logic associated with the first memory vault; and
    a prefetch controller to perform prefetch operations associated with the first memory vault.

2. The memory system of claim 1, further comprising:
    at least one prefetch buffer at a prefetch cache communicatively coupled to the prefetch controller to store at least one cache line of read data.

3. The memory system of claim 2, wherein the prefetch cache comprises a plurality of sets of prefetch buffers, each set of prefetch buffers comprising a cache line.

4. The memory system of claim 3, wherein the prefetch controller is configured to selectively enable at least one cache line.

5. The memory system of claim 1, wherein the prefetch controller is configured to issue a prefetch read request to the first memory vault when the first memory vault is idle.

6. The memory system of claim 5, wherein the prefetch controller is read at least one prefetch data word from a memory vault address corresponding to a data word read from the first memory vault in response to a previous read request.

7. The memory system of claim 5, wherein the prefetch controller is configured to read at least one prefetch data word from a memory vault address selected from a range of addresses provided by a device issuing commands to the memory vault controller.

8. The memory system of claim 1, wherein the prefetch controller is configured to selectively enable prefetch operations.

9. The memory system of claim 1, further comprising:
prefetch utilization logic communicatively coupled to the prefetch controller to track a number of cache line hits during a selected period of time.

10. The memory system of claim 1, wherein the prefetch controller is configured to disable the prefetch operations if a hit rate associated with a prefetch cache is below a selected threshold for a first selected period of time.

11. The memory system of claim 10, wherein the prefetch controller is configured to disable the prefetch operations for at least one of a second selected period of time or until a command to resume the prefetch operations is received from an originating device.

12. The memory system of claim 1, further comprising:
prefetch write logic communicatively coupled to the prefetch controller to update the first memory vault and a prefetch buffer with write data.

13. The memory system of claim 1, further comprising:
prefetch read logic communicatively coupled to the prefetch controller to read at least one prefetch word from at least one prefetch buffer if a read request received at the memory vault controller references the at least one prefetch word.

14. The memory system of claim 1, further comprising:
at least one of a voltage sensor or a temperature sensor at the first memory vault; and
a power monitor coupled to the voltage sensor or temperature sensor to provide an indication to the prefetch controller of a level of power consumption at the first memory vault.

15. The memory system of claim 14, wherein the prefetch controller is configured to disable prefetch operations if the level of power consumption at the first memory vault is above a first selected threshold.

16. The memory system of claim 15, wherein the prefetch controller is configured to re-enable the prefetch operations following at least one of a selected period of time, the level of power consumption dropping below a second selected threshold, or receipt of a command from an originating device to resume the prefetch operations.

17. The memory system of claim 1, wherein the prefetch controller is configured to perform at least one of enabling and disabling the prefetch operations according to locality of data stream in the memory system.

18. The memory system of claim 1, further comprising at least one prefetch buffer to store at least one prefetch data word associated with a prefetch read request.

19. The memory system of claim 1, wherein the prefetch controller is configured to perform prefetch operations when a rate of cache line hits is greater than a selected rate.

20. The memory system of claim 1, wherein the prefetch controller is configured to perform at least one of enabling and disabling prefetch operations associated with the first memory vault to target a selected power budget of the first memory vault.

21. The memory system of claim 1, wherein at least one of the memory vault controller and the prefetch controller is located in a logic die.

22. The memory system of claim 21, wherein the logic die is stacked with the plurality of stacked memory dies.

23. A memory system comprising:
a first memory vault comprising a first stacked plurality of memory arrays, each memory array in the first stacked plurality of memory arrays located on one of a plurality of stacked memory dies;
a second memory vault comprising a second stacked plurality of memory arrays, each memory array in the second stacked plurality of memory arrays located on one of the plurality of stacked memory dies, the plurality of stacked memory dies including a first memory die and a second memory die, the first stacked plurality of memory arrays including a first memory array and a second memory array, the first memory array located on the first memory die, the second memory array located on the second memory die, the second stacked plurality of memory arrays including a third memory array and a fourth memory array, the third memory array located on the first memory die, and the fourth memory array located on the second memory die; and
at least one controller communicatively coupled to at least one of the first and second memory vaults to provide at least one of control, switching, communication logic, or prefetch operations associated with at least one of the first and second memory vaults.

24. The memory system of claim 23, wherein the at least one controller is located in a logic die.

25. The memory system of claim 24, wherein the logic die is stacked with the plurality of stacked memory dies.

26. A memory system comprising:
a first memory vault comprising a first stacked plurality of memory arrays, each memory array in the first stacked plurality of memory arrays located on one of a plurality of stacked memory dies;
a second memory vault comprising a second stacked plurality of memory arrays, each memory array in the second stacked plurality of memory arrays located on one of the plurality of stacked memory dies, the plurality of stacked memory dies including a first memory die and a second memory die, the first stacked plurality of memory arrays including a first memory array and a second memory array, the first memory array located on the first memory die, the second memory array located on the second memory die, the second stacked plurality of memory arrays including a third memory array and a fourth memory array, the third memory array located on the first memory die, and the fourth memory array located on the second memory die;
a first controller communicatively coupled to the first memory vault to provide at least one of control, switching, communication logic, or prefetch operations associated with the first memory vault; and
a second controller communicatively coupled to the second memory vault to provide at least one of control, switching, communication logic, or prefetch operations associated with the second memory vault.

27. The memory system of claim 26, wherein the first and second controllers are located in a logic die.

28. The memory system of claim 27, wherein the logic die is stacked with the plurality of stacked memory dies.

* * * * *